United States Patent
Arakaki et al.

(10) Patent No.: US 9,210,947 B2
(45) Date of Patent: Dec. 15, 2015

(54) INFANT FORMULAE AND THEIR PREPARATIONS

(75) Inventors: Cecilia Arakaki, Utrecht (NL); Maarten Pieter Valk, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 0 days.

(21) Appl. No.: 14/398,951

(22) PCT Filed: May 11, 2012

(86) PCT No.: PCT/NL2012/050330
§ 371 (c)(1),
(2), (4) Date: Nov. 4, 2014

(87) PCT Pub. No.: WO2013/169097
PCT Pub. Date: Nov. 14, 2013

(65) Prior Publication Data
US 2015/0118350 A1  Apr. 30, 2015

(51) Int. Cl.
*A23L 1/29* (2006.01)
*C13K 5/00* (2006.01)
*A23L 1/30* (2006.01)

(52) U.S. Cl.
CPC . *A23L 1/296* (2013.01); *A23L 1/30* (2013.01); *C13K 5/00* (2013.01); *A23V 2002/00* (2013.01)

(58) Field of Classification Search
CPC ............ A23L 1/296; A23L 1/30; C13K 5/00; A23V 2200/32; A23V 2200/3202
USPC .............. 426/2, 311, 580, 590, 648, 658, 801
See application file for complete search history.

(56) References Cited

U.S. PATENT DOCUMENTS

| 2004/0214791 | A1 | 10/2004 | Auestad et al. |
| 2008/0041861 | A1 | 2/2008 | Crawford et al. |
| 2009/0142442 | A1 | 6/2009 | Rochat et al. |
| 2012/0000929 | A1 | 1/2012 | Ulstad et al. |

FOREIGN PATENT DOCUMENTS

WO  WO-2006/086130 A2  8/2006

OTHER PUBLICATIONS

International Search Report of PCT/NL2012/050330 mailed Mar. 11, 2013.

*Primary Examiner* — Helen F Heggestad
(74) *Attorney, Agent, or Firm* — Gilberto M. Villacorta; Sunit Talapatra; Foley & Lardner LLP

(57) ABSTRACT

The invention pertains to an infant formula powder composition comprising micronized lactose or lactose microcrystals (i) smaller than 30 micrometer, and/or (ii) of which at least 80% has a size less than 20 micrometer, and/or (iii) at least 80% has a size less than 10 micrometer, and/or (iv) having a median particle size D50 below 10 micrometer. The invention also pertains to the use of micronized lactose or lactose microcrystals for improving flow of an infant formula powder composition.

15 Claims, 2 Drawing Sheets

INFANT FORMULAE AND THEIR PREPARATIONS

CROSS REFERENCE TO RELATED APPLICATIONS

Figure 1:
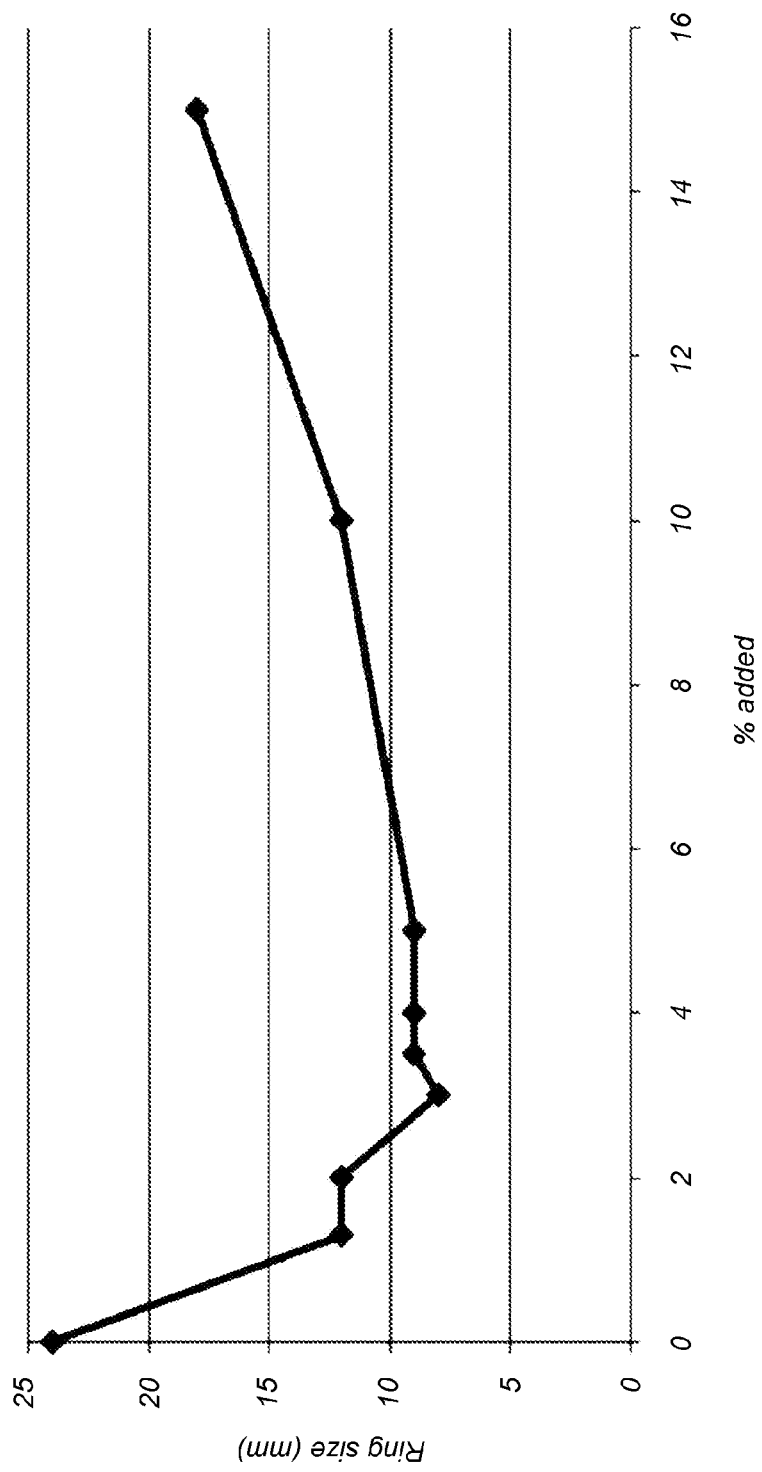

The present application is a National Stage of International Application No. PCT/NL2012/050330 filed on May 11, 2012, which was published on Nov. 14, 2013, as WO 2013/169097 A1, the entire disclosure of which is incorporated herein by reference.

BACKGROUND

Today, powdered infant formula is manufactured by more than a dozen firms in 40-50 processing plants worldwide. These formulations have to comply with strict regulations which allow for the use of only a limited number of ingredients which should or may be present within narrow ranges. Any changes beyond the regulatory nutrient requirements have to be notified to the regulatory bodies which have the authority to take compliance action if needed.

Hitherto, the main challenges the infant formula manufacturers face are those concerning nutritional and microbiological properties of infant formula, in their attempts to mimic human milk. Aside, there are however also issues concerning nutrient imbalances and powder flow properties. Some of these problems are easy dosing by preventing clumping and ease dissolving of the powder in water which is related to a particle structure and size distribution. This remains to be a challenging task for the manufacturers. Both moisture and fat present in infant formula potentially contribute to caking.

According to the instruction manuals provided with the commercial infant formulae, the end user should prepare a milk bottle by measuring the amount of powder using a scoop or spoon, and dispersing the pre-determined amount in water at the desired temperature. US 2008/0041861 is an example thereof. Without improved flow properties, scoops or spoons cannot be dispensed with; yet these spoons and scoops are found inconvenient by users: These typically end up in the powder and if left damp can become coated with powder. Dosing with scoops and spoons may be regarded as problematic. US2012/0000929 fails to provide a suitable solution using conventional infant formula.

In the art there is thus a need to avoid or minimize lumping and cohesion particularly when dispensing the formula in water.

SUMMARY OF THE INVENTION

In a first aspect, it is the inventors' contribution to the field of infant formulae to improve consumer handling of infant formula powder formulations by rendering such formulations having improved flowing properties, preferably reducing caking or lumping issues. With their insights consumer handling can be greatly improved, and it is much easier for the end user to prepare a baby milk bottle without making any hand contact with the powder. Infant formula can be dispensed without the need for spoons or scoops.

If anything is clear from the above, it is that flowability of infant formula compositions cannot be amended by incorporating just any free-flowing agent. Care is taken to introduce new components foreign to infant formula nutrients as these are defined by the CODEX STAN 73-1981 "*Standard For Infant Formula and Formulas For Special Medical Purposes Intended for Infants*" and regulatory bodies. It is therefore an object of the invention to render the infant formula powder in a free-flowing format without the need for ingredients not approved by authorities as infant formula nutrients.

To that end, the inventors have found that microcrystalline lactose could advantageously be used as a flowing agent to render the powder flowable. Lactose is one of those few nutrients that authorities allow for use in infant formulations, and is, albeit in larger forms, already part of the infant formula powder particulate material in copious amounts of about 40 wt %. The invention thus pertains to the use of micronized lactose or lactose microcrystals for improving flow of an infant formula powder composition.

The fact that fine lactose particles could advantageously be applied to render an infant formula with improved flow properties is unattended in the art: EP 1799052 discloses adding crystalline edible lactose together with minerals and vitamins only to a spray-dried, sterile mixture of proteins, lipids and carbohydrates, for controlling the formation of advanced glycation endproducts (AGE) during food processing involving heat steps (such as sterilization). The process using conventional lactose ingredients disclosed in EP 1799052 does not implicitly render any improved flow properties. Nevertheless, its contents are herein incorporated by reference in their entirety. The present inventors have found it is key to use micronized lactose or lactose microcrystals, sufficiently fine or small to render good flow properties.

Outside the field of infant formulae, WO1996/033619 discusses the usefulness of crystallized lactose microparticles as bulking agents, consistency-improving agents or as fat and/or sugar replacement agents. WO1996/033619 is looking for a fat-like mouthfeel. Also, lactose microcrystals are sometimes used in small amounts in the art as seeds for initiating and controlling crystallization in food products where so desired. Hitherto, there is however no use of lactose microcrystals in an infant formula, particularly not for controlling its flowing properties.

LIST OF EMBODIMENTS

In a first embodiment, the invention relates to an infant formula powder composition comprising micronized lactose or lactose microcrystals (i) smaller than 30 micrometer, and/or (ii) of which at least 80% has a size less than 20 micrometer, and/or (iii) at least 80% has a size less than 10 micrometer, and/or (iv) having a median particle size D50 below 10 micrometer.

In a preferred embodiment, said micronized lactose or lactose microcrystals in the infant formula powder composition as defined above are characterized by at least (iii) and/or (iv), preferably at least (iii).

In a preferred embodiment, said micronized lactose or lactose microcrystals are present in an amount of 0.5-20 wt %, preferably 0.5-15 wt %, more preferably 0.5-10 wt %, based on total weight of the composition.

In a preferred embodiment, at least 90% of said micronized lactose or lactose microcrystals have a size less than 10 micrometer.

In a preferred embodiment, the infant formula powder composition is free-flowing.

In a preferred embodiment, the infant formula powder composition has a Flodex flowability index of at least 50, preferably at least 80, preferably at least 100, more preferably at least 125, more preferably at least 170, even more preferably at least 200, most preferably at least 250.

In a preferred embodiment, the infant formula powder composition comprises 35-55 en % fat, based on total energy content.

In a preferred embodiment, the infant formula powder composition has a density of 0.45-0.52 g/ml.

In a preferred embodiment, the infant formula powder composition has a a moisture content of 2-3 wt %, based on total composition.

In a preferred embodiment, the infant formula powder composition comprises infant formula powder particles, said particles other than the micronized lactose or lactose microcrystals, said infant formula powder particles having a particle size of less than 400 micrometer, preferably less than 300 micrometer.

In a further aspect, the invention pertains to a method for manufacturing an infant formula powder composition, comprising (a) providing a spray-dried powder comprising proteins, lipids and carbohydrates, vitamins and micronutrients, (b) blending said powder with micronized lactose or lactose microcrystals (i) smaller than 30 micrometer, and/or (ii) of which at least 80% has a size less than 20 micrometer, and/or (iii) at least 80% has a size less than 10 micrometer, and/or (iv) having a median particle size D50 below 10 micrometer.

In a preferred embodiment, the said micronized lactose or lactose microcrystals used in the method are characterized by at least (iii) and/or (iv), preferably at least (iii).

In a further aspect, the invention pertains to the use of the infant formula powder composition according to one or more of the above embodiments for providing nutrition to an infant.

In a further aspect, the invention pertains to a method for providing nutrition to an infant, comprising providing said infant with the infant formula powder composition according to one or more of the above embodiments reconstituted in water.

LIST OF FIGURES

Figure 2:
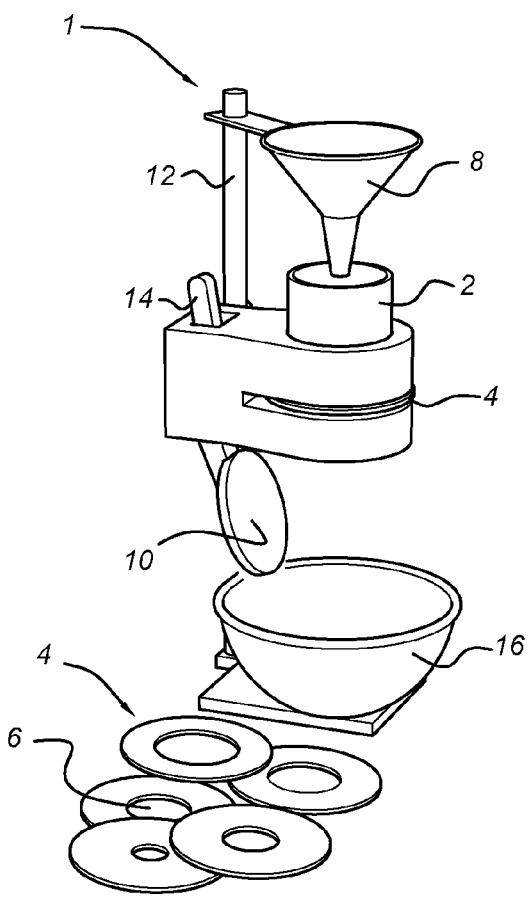
Figure 3:
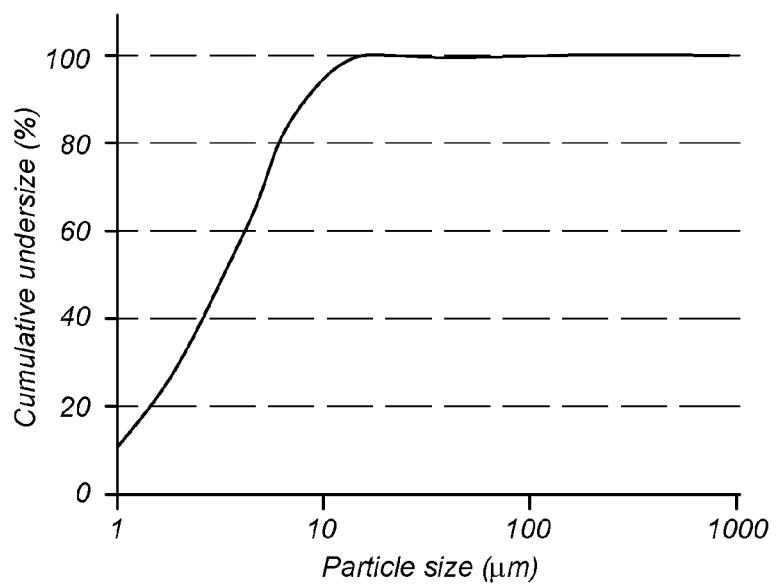

FIG. 1 depicts flowability of infant formula powder compositions as a function of the micronized lactose content;

FIG. 2 schematically represents a Flodex apparatus suitable for determining the flowability of the infant formula powder;

FIG. 3 shows the particle size distribution of micronized lactose according to specifications provided by the manufacturer.

DETAILED DESCRIPTION OF THE INVENTION

In a first aspect, the invention pertains to an infant formula powder composition comprising lactose microcrystals or micronized lactose. In a preferred aspect, the invention thus pertains to an infant formula powder composition comprising lactose microcrystals or micronized lactose with at least 80% of said particles having a size of less than 20 µm, preferably at least 90% of said particles having a size of less than 10 µm. Alternatively or additionally, the invention pertains to an infant formula powder composition comprising lactose microcrystals or micronized lactose smaller than 30 µm, preferably 0.1 -25 µm of size.

As detailed here above, 'infant formula' is well-defined and controlled internationally and consistently by regulatory bodies. In particular, the CODEX mentioned above is widely accepted. This recommends for nutritional value and formula composition, which require the prepared milk to contain per 100 ml not less than 60 kcal (250 kJ) and no more than 70 kcal (295 kJ) of energy. FDA and other regulatory bodies have set nutrient requirements in accordance therewith. In one embodiment, the infant formula is defined according to FDA 21 CFR 107.100. The content is herein incorporated by reference. The terminology 'infant formula powder' and 'powdered infant formula' are used interchangeably.

The present composition is preferably enterally administered, more preferably orally, upon reconstitution with water. The present composition excludes human milk. The present composition can be advantageously applied as a complete nutrition for infants. The present composition therefore preferably comprises a lipid component, protein component and carbohydrate component. The present infant formula is preferably provided as a packaged powder, and it may be accompanied with instructions as to mix said dry food mixture with a suitable liquid (e.g. water).

In a preferred embodiment, the terms 'lactose microcrystals', 'microfine lactose crystals, 'micronized lactose' and 'microcrystalline lactose' in the context of the present invention are all used interchangeably, and preferably refer to lactose particles: (i) smaller than 30 µm, preferably smaller than 25 µm, and/or (ii) of which at least 80% has a size less than 20 µm, preferably at least 90% has a size less than 20 µm, and/or (iii) at least 80% has a size less than 10 µm, more preferably at least 90% has a size less than 10 µm and/or (iv) having a median particle size D50 below 10 µm, preferably below 8 µm, more preferably below 7 µm, most preferably below 6 µm. The percentages in this paragraph are in terms of weight The lactose particles are preferably characterized by (iii) and/or (iv), preferably at least (iii) here above. The microparticles may be distinguished from the infant formula powder particulate materials by size, the latter being much larger. In one embodiment, the lactose microcrystals according to the invention have an average particle size ranging between 0.1 and 20 µm, more preferably between 0.5 and 15 µm, more preferably between 1 and 10 µm, most preferably between 2 and 10 µm.

The inventors found that good results are obtained when the micronized lactose content in the powder composition ranges between 0.5 and 20 wt %, more preferably between 0.5 and 15 wt %, even more preferably between 0.5 and 10 wt %, most preferably between 1 and 10 wt %, particularly between 1 and 8 wt %, based on total weight of the composition. Weight optimization is depicted in FIG. 1. Despite that no use is made of any nutrients foreign to infant formula, it is still preferred to maintain low levels of lactose microparticles. It is the inventors' belief that the optimum flow properties may be the interplay between the microcrystalline lactose particle size and the relative amount of particles present in the composition; with the knowledge provided by the inventors, it is considered within the ambit of the skilled person's knowledge to find the optimum amount and size distribution of micronized lactose particles in order to achieve the desired flow.

In one embodiment, the lactose microcrystals are alpha-lactose monohydrate particles which are milled or sieved to the desired particle size distribution. Good results are obtained with Lactochem®microfine, commercially available from DFE Pharma.

The infant formula powder according to the invention may be characterized in terms of its improved flowing properties. The improvement provided by the flowing agent of the invention may be characterized as 'easy flowing' or 'controlled flow'. Various manners of determining and defining flowability are available in the art. For the purpose of the present invention, this is determined in that the powdered infant formula composition preferably has an absolute value for the cohesion index of less than 14, preferably less than 12, for instance as measured using a TA. HD Plus Powder Flow Analyzer (Stable Micro Systems, Surrey, UK).

The infant formula according to the invention exhibits flow behavior which may readily be tested by the skilled person using routine experimentation available in the laboratory, for instance by flowability index measurement. Such a test according to the Flodex™ protocol (Pharma Alliance Group) is described in the Example below. This test is especially marketed for determining the Flodex flowability index measurements. The infant formula powder composition according to the present invention preferably flows freely by gravity through a circular opening having a width of 20 mm or less, preferably 16 mm or less, more preferably 12 mm or less, most preferably 8 mm or less. Worded differently, in the context of the invention, 'free-flowing', 'easy flowing' or 'flowing' preferably means that the infant formula powder in the above test continuously or interruptedly flows through the above-defined openings ['continuous flow' meaning that the infant formula poured through the opening is uninterrupted to the eye].

In a preferred embodiment, the flowing properties of the infant formula are still regarded acceptable for the purpose of the invention when showing flow through a circular opening having a width in the range of 4-20 mm, particularly 5-20 mm, more preferably 5-16 mm, more preferably 5-8 mm. For reference sake, commercially available infant formulae (lacking any free-flowing agents) are found to flow through an opening with a diameter of 24 mm only, at smaller-sized openings blocking occurs. More than other flow parameters existing in the art, this test is regarded indicative of the situation experienced by the end user when reconstituting the infant formula in water. Flowability index measurements (in terms of the minimum opening or 'ring size' through which flow was observed) are plotted as a function of the amount of microcrystalline lactose added in FIG. 1 attached. The results are in accordance with the above preferences.

Associated therewith, the powder of the invention may be characterized in terms of its Flodex™ flowability (index) according to the Flodex™ protocol (Pharma Alliance Group) as defined in the Example below, and which Flodex™ flowability index is defined as 1000 divided by the diameter in millimeters of the smallest hole through which the sample will pass three consecutive (Flodex) tests. The infant powder preferably exhibits a Flodex flowability index of at least 50, preferably at least 80, preferably at least 100, more preferably at least 125, more preferably at least 170, even more preferably at least 200, most preferably at least 250. For most practical purposes, Flodex flowability indexes greater than 500 would not be required since an opening of 2 mm diameter would unlikely allow sufficient flow for normal dosing purposes. In one embodiment, the Flodex flowability index is 200 - 250. The Flodex flowability index of commercial infant formulae is about 40. It is noted that the Flodex flowability index is a respected tool to characterize flowability for instance demonstrated outside the field in U.S. Pat. No. 5,236,920, its entire contents and particularly the part 'FLODEX METHOD FOR FLOWABILITY DETERMINATION herein incorporated by reference.

In one embodiment, the powder may be characterized in terms of its bulk density. "Bulk density" used herein is typically determined by measuring the volume that a given weight of the powder occupies when poured through a funnel into a stationary graduated cylinder. The powder preferably has a tapped bulk density of between 100 and 800 g/L, preferably between 150 and 700 g/L, more preferably between 180 and 600 g/L, particularly less than 500 g/L, most preferably less than 450 g/L, even more preferably less than 400 g/L. For the poured bulk density the above limits are preferably 50 g/l lower and can be straightforwardly calculated from the above ranges and numbers.

The infant formula according to the present invention preferably contains 35-55 energy % (preferably 35-50 en %) fat, more preferably 5 to 12.5 energy % (preferably 7.5-12.5 en %) protein; 40 to 55 energy % carbohydrates; and 35 to 50 energy % fat.

The term energy %, also abbreviated as en%, represents the relative amount each constituent contributes to the total caloric value of the formula. With the universally applied conversion factors these energy contributions could be recalculated in terms of relative weight amounts.

In one embodiment, the infant milk powder average particle size excluding the above-defined microparticles— ranges between 100 and 400 µm, preferably 130-300 µm; the average particle size is more preferably less than 250 µm.

The infant formula powder composition preferably has a density of 0.45-0.52 g/ml. In one embodiment, the infant formula powder composition has a moisture content of 2-3 wt %, based on total composition. These water levels are preferred to safeguard fat stability and minimize fat oxidation during shelf life.

The present composition preferably comprises at least one lipid selected from the group consisting of animal lipid (excluding human lipids) and vegetable lipids. Preferably the present composition comprises a combination of vegetable lipids and at least one oil selected from the group consisting of fish oil, animal oil, algae oil, fungal oil, and bacterial oil. Preferably the present composition comprises at least 0.50 wt %, preferably at least 0.60 wt %, more preferably at least 0.70 wt % LC-PUFAs with 20 and 22 carbon atoms of the total fat content It is preferred that at least 80 wt %, more preferably at least 85 wt %, most preferably 85-100 wt % of the LCPUFAs with 20 and 22 carbon atoms is provided by the combination of EPA and DHA.

The present infant formula preferably comprise protein selected from the group consisting of non-human animal proteins (such as milk proteins, meat proteins and egg proteins), vegetable proteins (such as soy protein, wheat protein, rice protein, and pea protein) and amino acids and mixtures thereof. Preferably the infant formula comprise cow milk derived nitrogen source, particularly cow milk proteins such as casein and whey proteins. In one embodiment the infant formula comprises hydrolyzed milk protein, for example hydrolyzed casein and/or hydrolyzed whey protein. The preferred infant formula in the context of the invention is dairy-based, i.e. 'infant milk formula'.

Because lactose is an important digestible carbohydrate source for infants, the present infant formula preferably comprises at least 35 wt. % lactose based on weight of total digestible carbohydrate, more preferably at least 50 wt. %, most preferably at least 75 wt. %. In one embodiment, the sum of all lactose including the micronized lactose in the infant formula powder composition amounts to 30-50 wt %, preferably 35-45% of the composition. Preferably, upon reconstitution, the composition comprises at least 3 g lactose/100 ml, more preferably at least 4 g/100ml, even more preferably at least 5 g per 100 ml. The amounts of micronized lactose are herein incorporated. The present composition preferably comprises 4 g to 18 g, more preferably 5 to 14 g digestible carbohydrates per 100 ml composition.

The composition preferably comprises between 1.5 and 2.5 gram indigestible oligosaccharides per 100 kcal, preferably comprising: i) 1.4-2 gram galactooligosaccharides with a degree of polymerization of 2-7; and ii) 0.1-0.5 gram fructopolysaccharides with degree of polymerization of 2-150. The term "fructopolysaccharides" comprises fructans and inulin, and hydrolyzates thereof. The preferred galactooligosaccharides are transgalactooligosaccharides. It is preferred that at least 95 wt %, preferably 95-100 wt % of the indigestible oligosaccharides is provided by galactooligosaccharides and fructopolysaccharides.

The infant formula preferably have a caloric density between 0.1 and 2.5 kcal/ml, even more preferably a caloric density of between 0.5 and 1.5 kcal/ml, most preferably between 0.6 and 0.8 kcal/ml. The infant formula of the present invention preferably have an osmolality between 50 and 500 mOsm/kg, more preferably between 100 and 400 mOsm/kg.

When in liquid form, the infant formula preferably has a viscosity between 1 and 100 mPa.s, preferably between 1 and 60 mPa.s, more preferably between 1 and 20 mPa.s, most preferably between 1 and 10 mPa.s. The viscosity of the liquid can be suitably determined using a Physica Rheometer MCR 300 (Physica Messtechnik GmbH, Ostfilden, Germany) at shear rate of 95 $s^{-1}$ at 20° C. This viscosity closely resembles the viscosity of human milk. Furthermore, a low viscosity results in a normal gastric emptying and a better energy intake, which is essential for infants who need the energy for optimal growth and development.

In one aspect, the invention pertains to a method for manufacturing an infant formula powder composition as defined above, said method comprising (i) providing a spray-dried powder comprising proteins, lipids and carbohydrates, vitamins and micronutrients, and (ii) blending said powder with lactose microcrystals smaller than 30 μm. Step (ii) is preferably a dry-mixing step.

In one aspect, the invention pertains to the use of the improved infant formula powder composition for providing nutrition to an infant. Infant formulae are particularly intended for providing nutrition to infants with an age between 0 and 3 years, and more preferably infants under 1 year of age. The invention also relates to a method for providing nutrition to an infant, comprising providing said infant with the infant formula powder composition reconstituted in water, in accordance with the reconstitution instructions provided in the instruction manual accompanying the infant formula powder composition. In the context of the present invention, the method for providing nutrition to an infant is considered a non-therapeutic method.

EXAMPLES

Infant Milk Formula Powder Composition

A commercially available infant formula powder composition (Nutrilon Standard 2™ [Nutricia]) was blended with x wt % of Lactochem®microfine from DFE Pharma, x being 0, 1, 2, 3, 3.5, 4, 5, 10 and 14, respectively, x being calculated on the total weight of the blended powder composition. The infant formula powder specifications are in line with those ranges regarded accepted by the regulatory bodies and as defined herein above. FIG. 3 shows the particle size and particle size distribution specifications of Lactochem®microfine as provided by the manufacturer.

Flowability Index Measurements

The Flodex apparatus 1 as shown in FIG. 2, consists of a cylinder 2 with interchangeable disks 4 with holes 6 of various diameters located at the bottom of the cylinder 2. The determination of flowability is based upon the ability of the powder to fall freely through the hole 6 in the disk 4. The smaller the hole through which the powder falls freely, the better is the flowability. A funnel 8 is provided with its outlet at within 2 cm above the cylinder 2. The hole 6 in the disk 4 at the base of the cylinder is initially kept closed by a closure plate 10, which is hinged downwardly from a retort stand 12 from which the funnel 8 and cylinder 2 are also supported. The closure plate 10 can be released by action of a release lever 14. A receptacle 16 is located below the cylinder 2. Disks with holes of: 4; 5; 6; 7; 8; 9; 10; 12; 14; 16; 18; 20; 22; 24; 26; 28; 30; 32 and 34 mm are provided.

Test Protocol

With the closure plate 10 in the closed position, around 160 mL of material as prepared above is loaded carefully into the cylinder 2 through the funnel, to fill it to within approximately 1 cm of the top. The material is allowed to settle for 60 seconds without tapping or otherwise disturbing the apparatus. The release lever 14 is actuated causing the closure plate 10 to pivot away from the disk 4. The test is deemed positive if the material flows out of the cylinder 2 such that an opening is visible through the disk. The test is carried out successively with smaller disks until flow hampers. From the smallest ring showing acceptable flow, the Flodex flowability can be calculated, which is defined as 1000 divided by the diameter in millimeters of the smallest hole through which the sample will pass three consecutive tests.

Results

The flowability results in terms of minimum disk opening still showing flow of infant formula compositions have been plotted in FIG. 1, using the relative amount of micronized lactose derived as Lactochem®microfine from DFE Pharma as a parameter. It is noted that the figure also incorporates the relatively poor flow properties for commercially available infant formulae without any microparticles additions (Nutrilon standard 2™ [Nutricia]).

The invention claimed is:

1. An infant formula powder composition comprising micronized lactose or lactose microcrystals (i) smaller than 30 micrometer, and/or (ii) of which at least 80% has a size less than 20 micrometer, and/or (iii) at least 80% has a size less than 10micrometer, and/or (iv) having a median particle size D50 below 10 micrometer.

2. The infant formula powder composition according to claim 1, wherein at least 80% of the micronized lactose or lactose microcrystals have a size less than 10micrometer.

3. The infant formula powder composition according to claim 1, wherein the micronized lactose or lactose microcrystals are present in an amount of 0.5-20 wt %, based on total weight of the composition.

4. The infant formula powder composition according to claim 1, wherein at least 90% of the micronized lactose or lactose microcrystals have a size less than 10 micrometer.

5. The infant formula powder composition according to claim 1, the composition being free-flowing.

6. The infant formula powder composition according to claim 1, having a Flodex flowability index of at least 50.

7. The infant formula powder composition according to claim 1, comprising 35-55-en % fat, based on total energy content.

8. The infant formula powder composition according to claim 1, having a density of 0.45 -0.52 g/ml.

9. The infant formula powder composition according to claim 1, having a moisture content of 2-3 wt %, based on total composition.

10. The infant formula powder composition according to claim 1, comprising infant formula powder particles, the particles other than the micronized lactose or lactose microcrystals, the infant formula powder particles having a particle size of less than 400 micrometer.

11. A method for manufacturing an infant formula powder composition, comprising (a) providing a spray-dried powder comprising proteins, lipids and carbohydrates, vitamins and micronutrients, (b) blending the powder with micronized lactose or lactose microcrystals (i) smaller than 30 micrometer, and/or (ii) of which at least 80% has a size less than 20 micrometer, and/or (iii) at least 80% has a size less than 10 micrometer, and/or (iv) having a median particle size D50 below 10micrometer.

12. The method according to claim 11, wherein at least 80% of the micronized lactose or lactose microcrystals have a size less than 10 micrometer.

13. A method for providing nutrition to an infant, comprising administering an infant formula powder composition according to claim 1 to the infant.

14. The method according to claim 13, comprising reconstituting the powder composition in water.

15. A method for improving flow of an infant formula powder composition, comprising adding micronized lactose or lactose microcrystals according to claim 1 to the composition.

* * * * *